United States Patent [19]
Long, Jr.

[11] Patent Number: 5,964,392
[45] Date of Patent: Oct. 12, 1999

[54] WIRE DEREELING UNIT AND MARKING UNIT FOR A WIRE PROCESSING MACHINE

[75] Inventor: Alden Owen Long, Jr., Carlisle, Pa.

[73] Assignee: The Whitaker Corporation, Wilmington, Del.

[21] Appl. No.: 08/916,857

[22] Filed: Aug. 22, 1997

[51] Int. Cl.[6] .............................. G03B 1/56; B65H 20/24
[52] U.S. Cl. ...................... 226/91; 226/117; 226/118.2; 242/564.4
[58] Field of Search .................................. 226/91, 118.2, 226/118.3, 118.1, 117, 143; 242/564.4

[56] References Cited

U.S. PATENT DOCUMENTS

| | | | |
|---|---|---|---|
| 3,475,255 | 10/1969 | Lang | 226/118.2 X |
| 3,502,535 | 3/1970 | Bongers et al. | 226/118.2 X |
| 3,556,373 | 1/1971 | Whitney | 226/117 |
| 3,583,619 | 6/1971 | Shepherd | 226/118.2 X |
| 4,638,558 | 1/1987 | Eaton | 29/861 |
| 4,690,349 | 9/1987 | Yamaguchi et al. | 226/118.2 X |
| 5,163,594 | 11/1992 | Mayer | 226/118.2 |

*Primary Examiner*—Michael R. Mansen
*Attorney, Agent, or Firm*—Bruce J. Wolstoncroft

[57] ABSTRACT

A wire processing machine is disclosed having a wire feed unit (14) that draws wire (22) from an endless source (20). A wire processing unit (12) receives the wire from the feed unit for performing a manufacturing operation therewith, the wire being intermittently fed by the feed unit (14). A dereeling unit (18) is provided having a drive mechanism (28,30) in driving engagement with the wire (22) for removing the wire at a constant speed. A tensioning device (42, 46, 74, 76) is provided to maintain a desired tension on the wire (22) during dereeling. A wire marking unit (16) is provided including a wire storage mechanism (110, 114, 138, 140) arranged for storing a selected length of wire so that the marking unit can be positioned close to the machine (10).

24 Claims, 5 Drawing Sheets

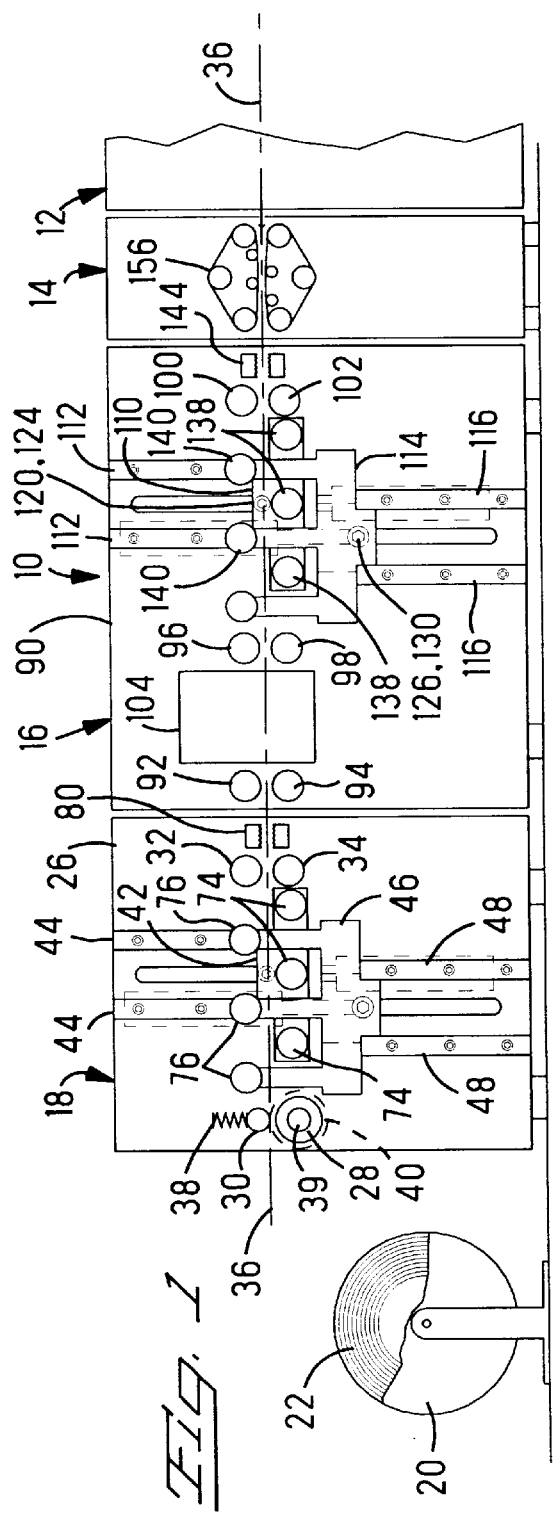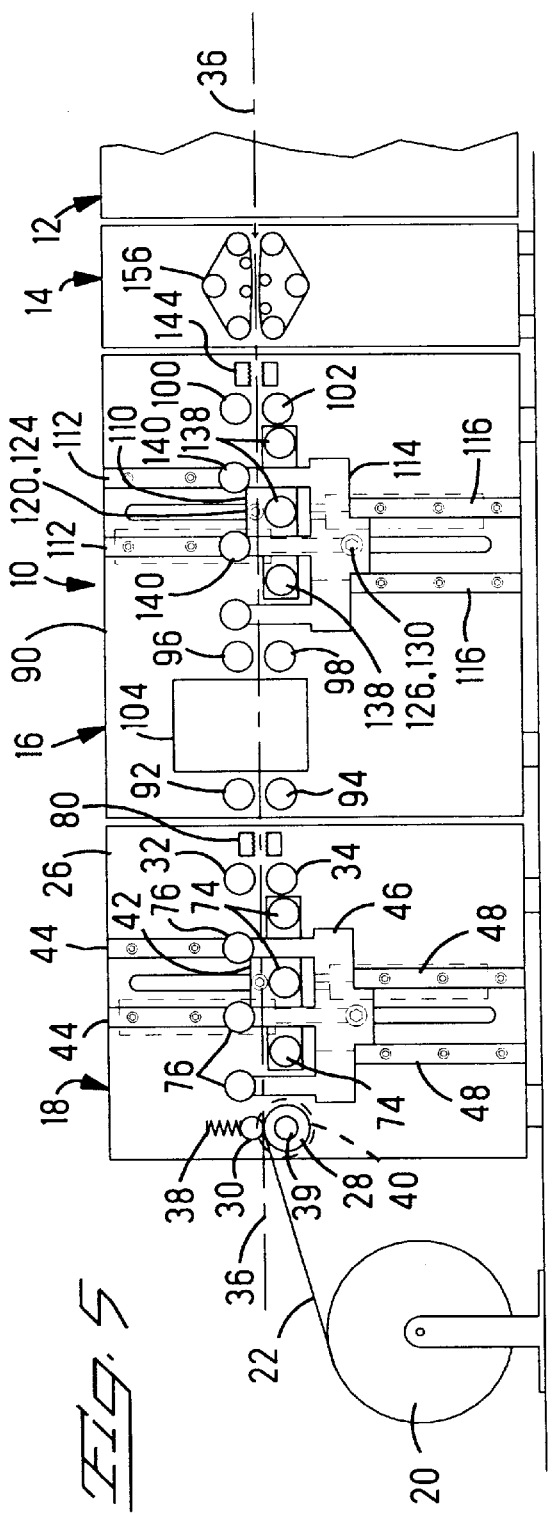

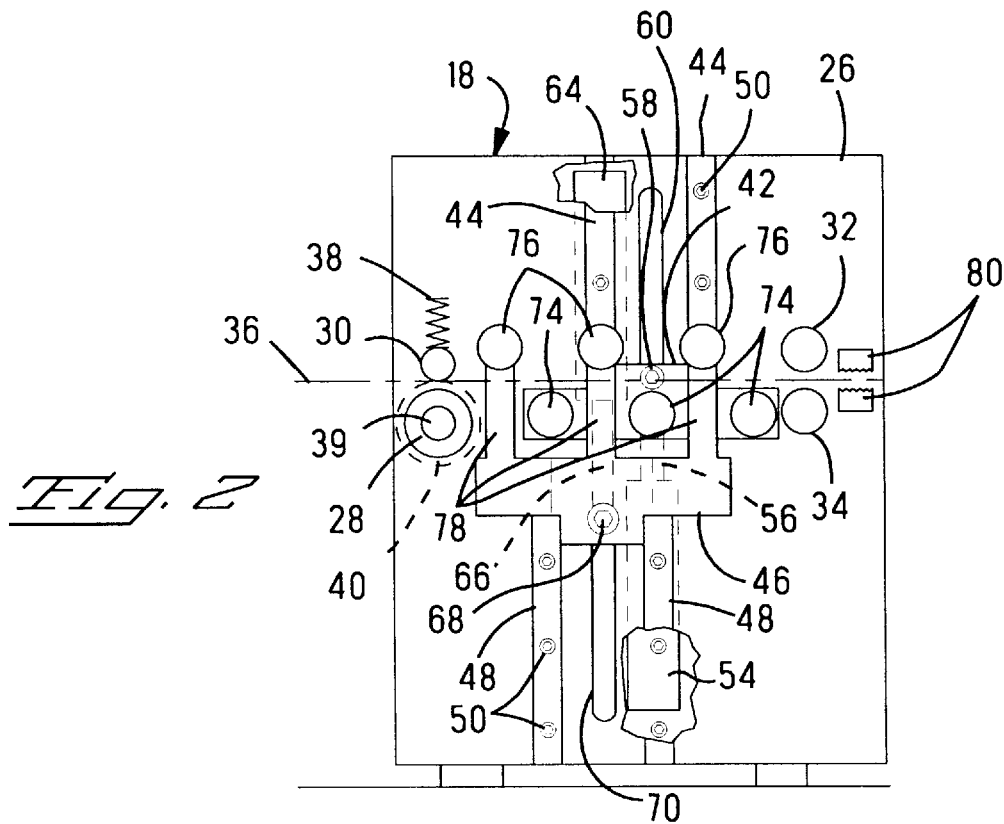
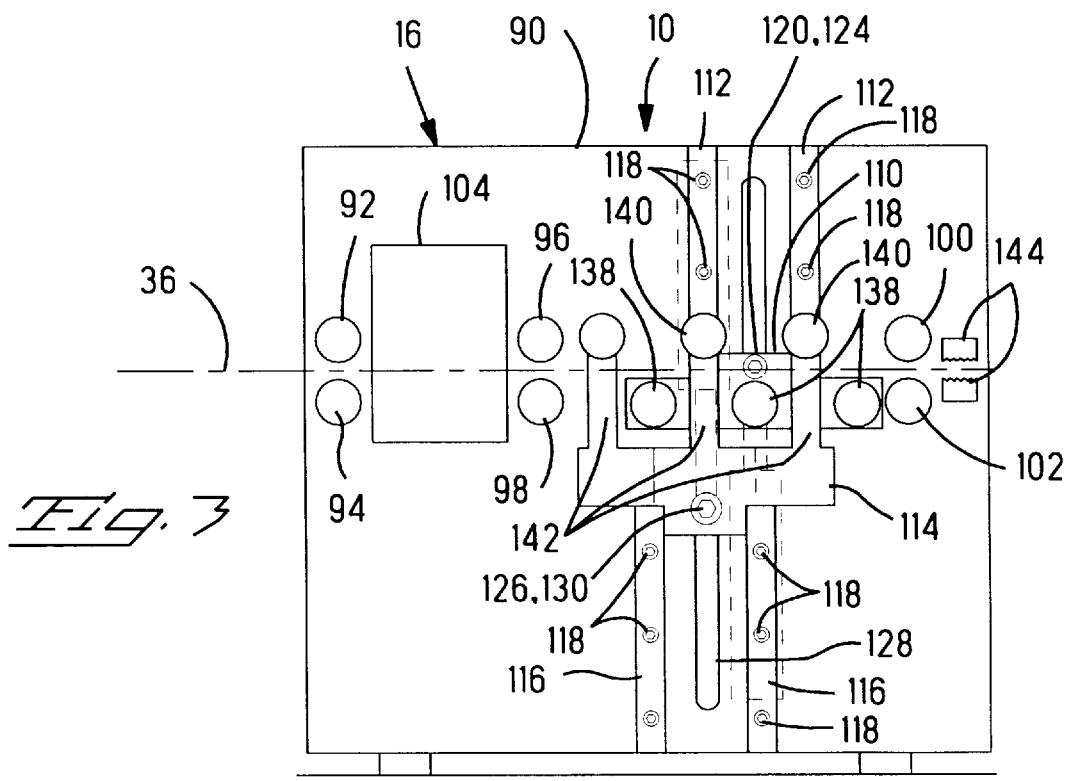

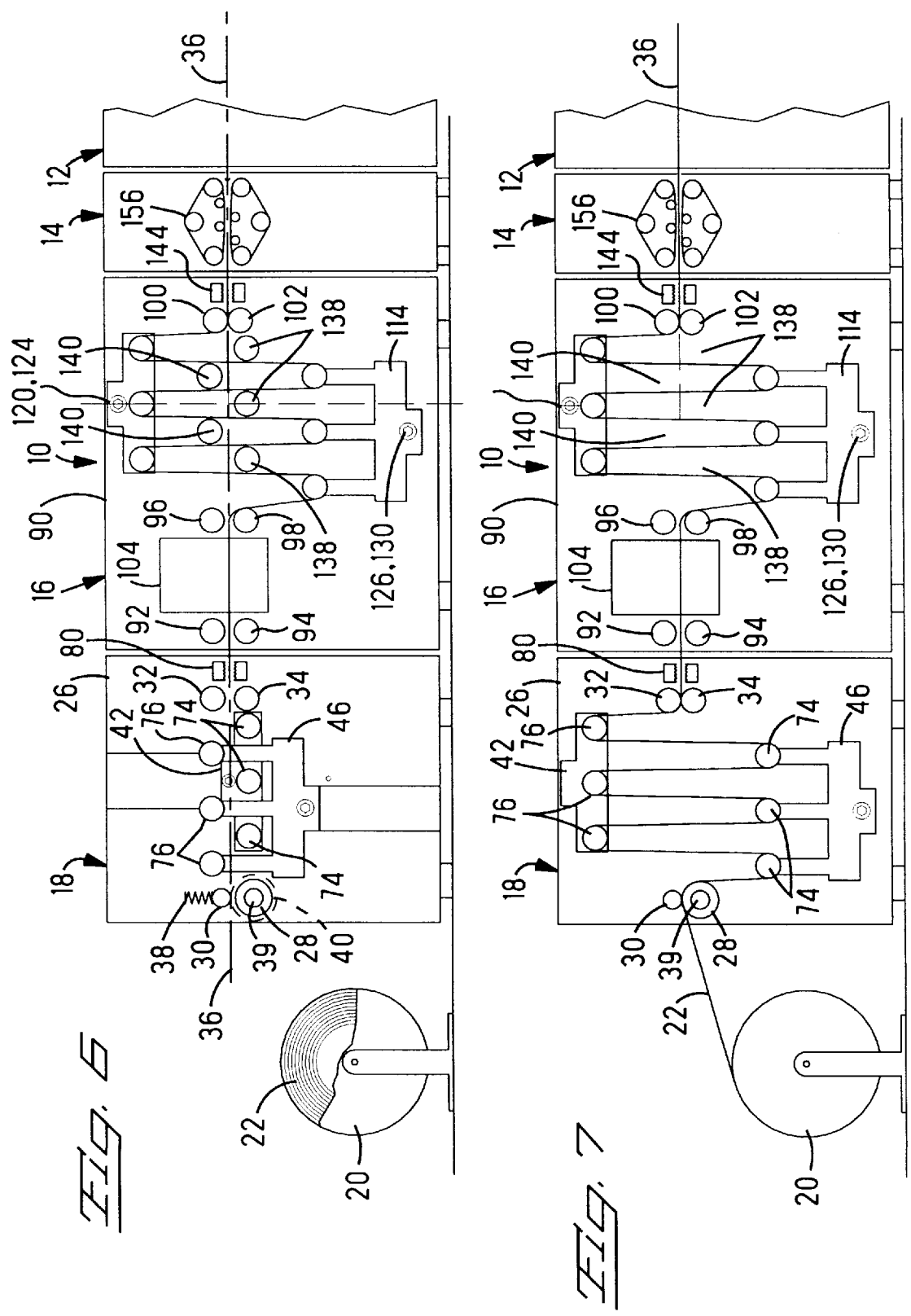

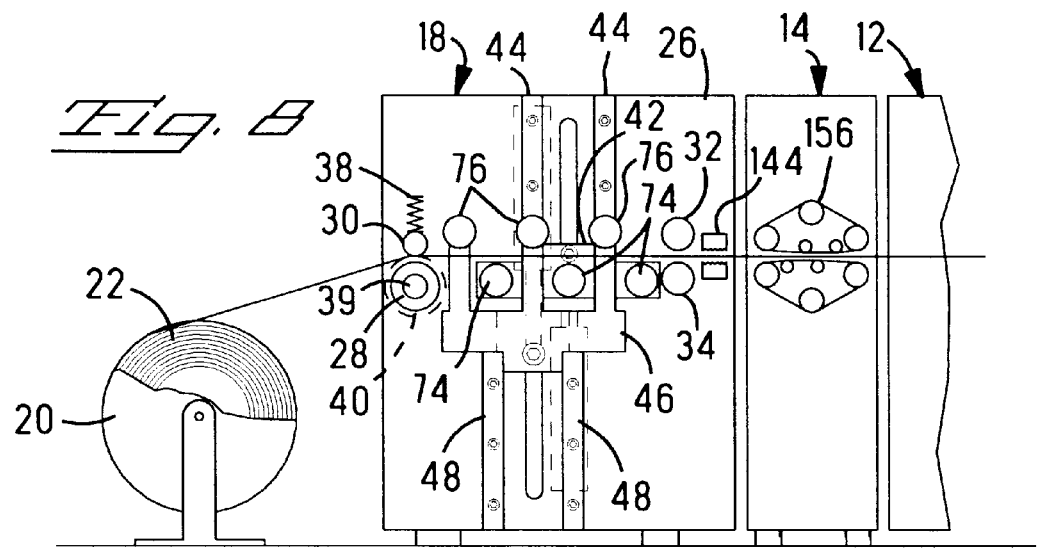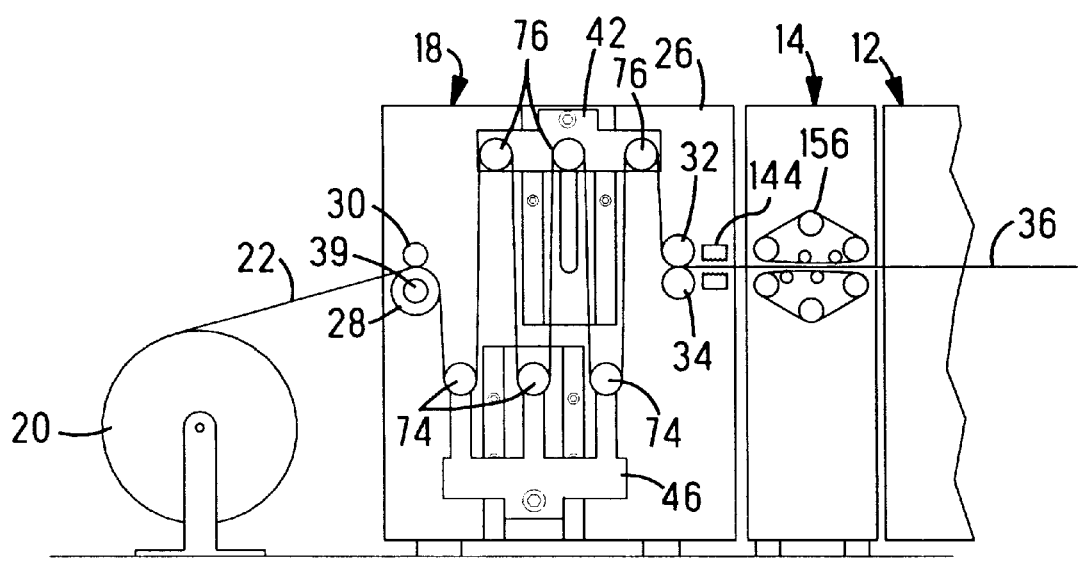

WIRE DEREELING UNIT AND MARKING UNIT FOR A WIRE PROCESSING MACHINE

The present invention relates to automated machines for processing electrical wires and more particularly to a dereeling unit with a wire tensioning device and a wire marking unit having a wire storage mechanism for such a machine.

BACKGROUND OF THE INVENTION

Machines that utilize electrical wire in the manufacture of a product typically draw lengths of wire from an endless source, such as a reel, and feed the drawn wire into mechanisms that operate on the wire in some way to produce the product. Sometimes the wire is cut to a specific length and it becomes the product, other times the wire is used to interconnect electrical components in a product. The former, for example, is made by a machine that is typically called a "lead maker" in the industry. These machines draw wire from an endless source, measuring its length precisely, then cutting it to a desired length. The ends may or may not be terminated to electrical terminals, or the ends may simply be prepared for termination. In any case, at the instant that the wire is being operated upon it must be stationary with respect to the operating tooling. Therefore, the feed mechanism must feed the wire in incremental amounts that correspond in length and timing to the operations being performed on the wire. These machines process wire at a rate of up to 450 inches per second and may impart acceleration to the wire of up to 3000 inches per second per second. As the wire is being incrementally fed under these conditions of high speed and high acceleration, the wire reel from which the wire is being drawn can offer significant resistance due to its inertia. This resistance can over stress the wire. Additionally, as the wire is being pulled by the feed unit the wire reel will occasionally begin to rotate too fast so that wire spills out onto the floor faster than it can be picked up by the intermittent wire feed unit. Attempts to alleviate this problem include the rotation of the wire reel in timed relation to the feed unit or a mechanism to absorb the shock of the wire and to store wire slack. The shock absorbing mechanism is now widely used in the industry because rotation of the wire reel is difficult to control without complex equipment. The shock absorbing mechanism usually consists of two horizontally disposed shafts, one vertically above the other. The first shaft is fixed while the second is arranged to move vertically toward or away from the first shaft and is biased in the away direction either by gravity or a spring. Each shaft has several pulleys arranged thereon with the wire threaded around the first pulley on the first shaft then around the first pulley of the second shaft then around the second pulley of the first shaft, and so forth. As the wire exits the last pulley it is threaded into the wire feed unit of the machine. As the feed unit intermittently draws wire, the lower second shaft moves toward the first shaft by the amount required to supply the wire being drawn. When the feed unit pauses the second shaft, being biased away from the first shaft, will tension the wire thereby causing the wire reel to turn. This uncontrolled turning of the wire reel is characterized by alternating fast and slow rotation so that the wire is still stressed at points of the feed cycle and the wire reel may occasionally turn too fast so that slack wire is spilled out onto the floor. These machines usually include a wire marking unit that must be positioned a specific distance away from the feed unit for marking the ends of the wires being processed during null periods of feeding. When the lengths of the wires being processed are quite long, twenty feet for example, the wire marking unit must be placed up to twenty feet away from the machine thereby requiring an inordinate amount of floor space.

What is needed is a wire dereeling unit that draws wire from the wire reel at a constant speed so that the wire reel turns at a more constant speed, while permitting intermittent feeding of the wire by the feed unit. Additionally, the wire marking unit should include wire storage capacity sufficient to permit marking of the wire during null periods of feeding without extending the length of the machine beyond reasonable limits.

SUMMARY OF THE INVENTION

A machine is provided having a wire feed unit that draws wire from an endless source. A wire processing unit receives the wire from the feed unit for performing a manufacturing operation therewith, the wire being intermittently fed by the feed unit. A dereeling unit is disposed between the endless source and the wire feed unit having a drive mechanism in driving engagement with the wire for removing the wire from the endless source at a constant speed. The feed unit is arranged to draw the removed wire and feed it to the wire processing unit. A tensioning device is provided to maintain a desired tension on the wire between the drive means and the feed unit. A wire marking unit is provided including a wire storage mechanism arranged for storing a specific length of the wire, the storage unit being adjustable for storing a length of wire that permits marking of the wire during null periods of the intermittent feed cycle.

DESCRIPTION OF THE FIGURES

FIG. 1 is a schematic representation of an automated machine incorporating the teachings of the present invention;

FIG. 2 is an enlarged view of the dereeling unit shown in FIG. 1;

FIG. 3 is an enlarged view of the wire marking unit shown in FIG. 1;

FIG. 5 is a view similar to that of FIG. 1 showing a wire threaded into the machine preparatory to operation;

FIG. 6 is a view similar to that of FIG. 2 showing the wire storage mechanism in engagement with the wire;

FIG. 7 is a view similar to that of FIG. 3 showing the wire tensioning device in engagement with the wire, the machine being ready for operation;

FIG. 8 is a schematic representation of an automated machine, similar to that shown in FIG. 2, without the wire marking unit; and FIG. 9 is a view similar to that of FIG. 5 showing the wire tension device in engagement with the wire, the machine being ready for operation.

DESCRIPTION OF THE PREFERRED EMBODIMENT

Figure 4:
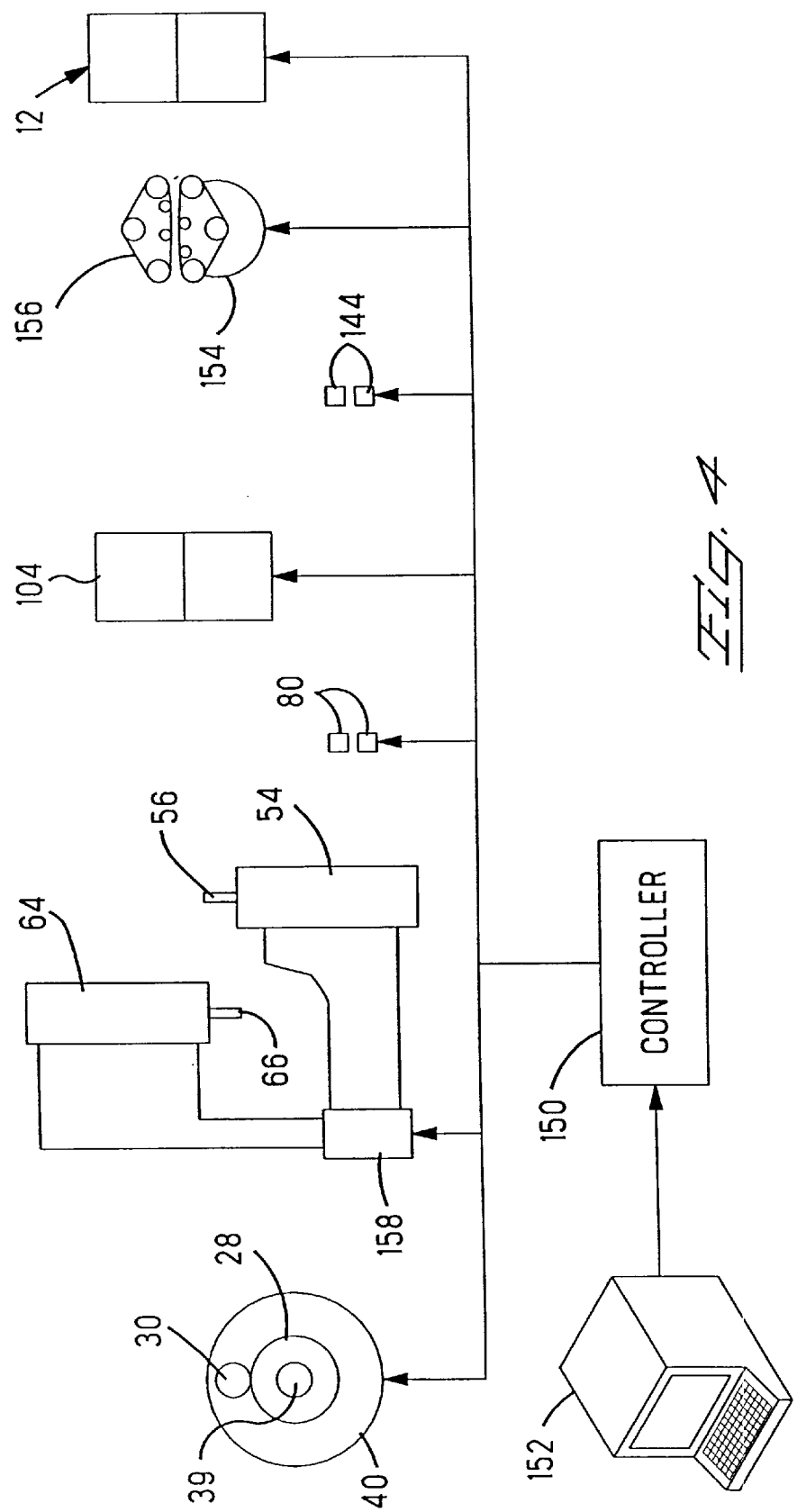
FIG. 4 is a schematic depiction of some of the operating elements of the machine shown in FIG. 1.

There is shown in FIG. 1 an automated machine 10 having a wire processing unit 12, a lead maker in the present example, a wire feed unit 14, a wire marking unit 16, and a wire dereeling unit 18. The units 12 through 18 may be individual stand alone units as shown in FIG. 1, or some or all of them may be integrated into a single unit, or two or more composite units. An endless source of wire, in the present example a reel 20 of wire 22, is positioned adjacent the dereeling unit 18 which is arranged to draw the wire 22 from the reel at a constant speed, making the drawn wire available to the wire feed unit 14, as will be described.

The dereeling unit 18 includes a frame 26, a wire drive mechanism consisting of a capstan 28 and pressure roller 30 and a pair of outlet guide rollers 32 and 34. The capstan 28 and pressure roller 30 described herein are by way of example only. It will be understood that any suitable wire dereeling drive that utilizes belts of rollers may be used in the practice of the present invention. The capstan and pressure roller and the two outlet guide rollers are arranged on opposite sides of the frame 26 and define a wire threading path 36 therebetween. The wire threading path 36 extends horizontally along a substantially straight line through the feed unit 14, the marking unit 16, and the dereeling unit 18, as shown in FIG. 1. The pressure roller 30 is urged into driven engagement with the capstan 28 by means of a resilient member 38. The capstan 28 is attached to the output shaft 39 of a variable speed motor 40, attached to the frame 26. The variable speed motor 40 rotates the capstan clockwise, as viewed in FIGS. 1 and 2, to draw the wire 22 from the reel 20.

As best seen in FIGS. 1 and 2, the dereeling unit includes a tensioning device having a first movable slide 42 arranged in sliding engagement with ways 44, and a second movable slide 46 arranged in sliding engagement with ways 48, the ways 44 and 48 being attached to the frame 26 by means of screws 50, as shown in FIG. 2. The first and second movable slides 42 and 46 are arranged to slide in their respective ways 44 and 48 toward and away from each other between a first position, shown in FIGS. 1 and 2, and a second position, shown in FIG. 7. An actuator, such as an air cylinder 54, is attached to the frame 26 and has its piston rod 56 coupled to a stud 58 that is attached to the movable slide 42, for effecting movement of the slide between its first and second positions. The stud 58 extends through an elongated clearance opening 60 formed in the frame 26, the slide 42 being on the near side of the frame and the cylinder 54 being on the far side, as viewed in FIGS. 1 and 2. Similarly, an actuator or air cylinder 64, is attached to the frame 26 and has its piston rod 66 coupled to a stud 68 that is attached to the movable slide 46, for effecting movement of the slide between its first and second positions. The stud 68 extends through an elongated clearance opening 70 formed in the frame 26, the slide 46 being on the near side of the frame and the cylinder 64 being on the far side, as viewed in FIGS. 1 and 2. Three tension rollers 74 are journaled for rotation in the first movable slide 42 and spaced apart as shown. The tension rollers 74 are arranged on a first side, or lower side as viewed in FIGS. 1 and 2, of the wire threading path 36 when the first movable slide 42 is in its first position as shown. However, when the first movable slide 42 is moved to its second position, as shown in FIG. 7, the tension rollers 74 are arranged on a second side, or upper side of the wire threading path 36, as shown. Similarly, three tension rollers 76 are journaled for rotation on the ends of arms 78 extending from the second movable slide 46, as shown in FIGS. 1 and 2. The tension rollers 76 are positioned on the second side, or upper side of the wire threading path 36 when the second movable slide 46 is in its first position as shown in FIGS. 1 and 2. Note that, in this first position, two of the arms 78 and their tension rollers 76 extend between adjacent tension rollers 74 while the remaining arm 78 and its tension roller 76 extend between the left most tension roller 74 and the capstan 28. The tension rollers 74 are spaced sufficiently apart to permit the tension rollers 76 to pass therebetween. When the second movable slide 46 is moved to its second position, as shown in FIG. 7, the tension rollers 76 are positioned on the first side, or lower side of the wire threading path 36, as shown. A wire clamp 80 is coupled to the frame 26 along the wire threading path 36 for securely clamping the wire to hold it steady during the wire marking operation. Note that this wire clamp 80 may alternatively be mounted to the wire marking unit 16 instead of to the dereeling unit 18 if it is more convenient to do so.

As shown in FIGS. 1 and 3, the wire marking unit 16 includes a frame 90, a pair of inlet guide rollers 92 and 94, a pair of intermediate guide rollers 96 and 98, and a pair of outlet guide rollers 100 and 102. The inlet and outlet guide rollers are arranged on opposite sides of the frame 90 with each pair, including the intermediate guide rollers, straddling the wire threading path 36. A wire marker 104 is attached to the frame 90 between the inlet guide rollers 92,94 and the intermediate guide rollers 96,98. The marker may be any suitable wire marker that is commercially available.

As best seen in FIGS. 1 and 3, a third movable slide 110 is arranged in sliding engagement with ways 112, and a fourth movable slide 114 is arranged in sliding engagement with ways 116, the ways 112 and 116 being attached to the frame 90 by means of screws 118, as shown in FIG. 3. The third and fourth movable slides 110 and 114 are arranged to slide in their respective ways 112 and 116 toward and away from each other between a first position, shown in FIGS. 1 and 3, and a second position, shown in FIG. 7. A screw 120 extends through a clearance hole in the third movable slide 110, through an elongated clearance opening 122 formed in the frame 90, and into threaded engagement with a nut 124, the slide 110 being on the near side of the frame and the nut 124 being on the far side, as viewed in FIGS. 1 and 3. Similarly, a screw 126 extends through a clearance hole in the fourth movable slide 114, an elongated clearance opening 128 formed in the frame 90, and into threaded engagement with a nut 130, the slide 114 being on the near side of the frame and the nut 130 being on the far side, as viewed in FIGS. 1 and 3. Three storage rollers 138 are journaled for rotation in the third movable slide 110 and spaced apart as shown. The storage rollers 138 are arranged on a first side, or lower side as viewed in FIGS. 1 and 3, of the wire threading path 36 when the third movable slide 110 is in its first position as shown. However, when the third movable slide 110 is moved to its second position, as shown in FIG. 7, the storage rollers 138 are arranged on a second side, or upper side of the wire threading path 36, as shown. Similarly, three storage rollers 140 are journaled for rotation on the ends of arms 142 extending from the fourth movable slide 114, as shown in FIGS. 1 and 3. The storage rollers 140 are positioned on the second side, or upper side of the wire threading path 36 when the fourth movable slide 114 is in its first position as shown in FIGS. 1 and 3. Note that, in this first position, two of the arms 142 and their storage rollers 140 extend between adjacent storage rollers 138 while the remaining arm 142 and its storage roller 140 extend between the left most storage roller 138 and the intermediate guide rollers 96 and 98. The storage rollers 138 are spaced sufficiently apart to permit the storage rollers 140 to pass therebetween. When the fourth movable slide 114 is moved to its second position, as shown in FIG. 7, the storage rollers 140 are positioned on the first side, or lower side of the wire threading path 36, as shown. A wire clamp 144 is coupled to the frame 90 along the wire threading path 36 for securely clamping the wire to hold it in place while moving the third and fourth movable slides 110 and 114 to their second positions, shown in FIGS. 6 and 7, during the initializing process as will be described. Optionally, the wire marking unit 16 may include a crank and lead screw mechanism, not shown, coupled to the third and fourth movable slides 110 and 114 for manually moving the movable slides and their respective storage rollers 138 and 140 between their first and second positions. Further, the operation of the lead screw mechanism lends itself to automation by the addition of a suitable actuator that can be controlled by the controller 150, or suitable actuators may be coupled directly to the third and fourth movable slides 110 and 114.

The functional operating elements of the machine 10 are schematically depicted in FIG. 4 where there is shown a programmable controller 150 interconnected to an operator terminal 152 in the usual manner for controlling these operating elements. A feed drive variable speed motor 154 is coupled to the feed drive 156 in the usual manner and is used to intermittently feed the wire 22 into the wire processing unit 12. The variable speed motor 40 rotates the capstan 28 at a speed in accordance with the rate of feed of the wire through the wire processing unit 12, as determined by the controller 150. The rate of feed of the wire through the wire processing unit 12 can be determined either directly by means of an encoder, not shown, having a wheel in direct measuring engagement with the wire or other similar device or indirectly by noting rotational movement of the variable speed motor 154. An air valve 158 is coupled to the two air cylinders 54 and 64 to provide differential pressure to the two ends of each cylinder as required during operation of the machine 10 and under the control of the controller 150. The controller 150 additionally is interconnected to and controls the operation of the two wire clamps 80 and 144, the wire marker 104, and the wire processing unit 12.

The operation of the machine 10 will now be described with reference to FIGS. 1 and 4 through 7. The movable slides 42, 46, 110, and 114 are initialized to their first positions as shown in FIG. 1. The wire clamps 80 and 144 are in their open positions. This advantageously permits the threading of the wire along the straight wire threading path 36 without the necessity of winding the wire about any parts of the machine and without departing from a straight path, from the drive mechanism through the feed unit, thereby simplifying the wire threading procedure. The wire 22 is placed between the pressure roller 30 and the capstan 28 and then threaded between the tension rollers 74 and 76, through the clamp 80, the marker 104 and associated guide rollers 92,94 and 96,98, between the storage rollers 138 and 140, the clamp 144, the feed drive 156, and into the wire processing unit 12, as shown in FIG. 5. The wire clamp 144 is then closed by the controller 150 to hold the wire 22 in its present position with respect to the wire processing unit 12. The operator then manually moves the third and fourth movable slides 110 and 114, respectively, so that the storage rollers 138 and 140 move toward their second positions while causing the wire 22 to follow a zigzag path between the two sets of storage rollers. As the storage rollers 138 and 140 engage the wire and move away from each other, as shown in FIG. 6, wire 22 is draw from the reel 20 and is stored between the storage rollers. The length of wire to be stored between the storage rollers 138 and 140 is chosen to precisely position the wire for wire marking when the wire feed drive 156 pauses. This stored length is usually a multiple of the lead length of the leads being processed by the wire processing unit 12. When the desired length of wire 22 is stored between the storage rollers 138 and 140 the two movable slides 110 and 114 are securely locked in position by tightening the screw and nut pairs 120,124 and 126, 130. The wire clamp 80 is then closed and the air cylinders 54 and 64 pressurized by the controller 150. The first and second movable slides 42 and 46 begin to move away from each other so that the two sets of tension rollers 74 and 76 engage the wire 22 and move toward their second positions. This causes the wire 22 to follow a zigzag path between the two sets of tension rollers. As the tension rollers 74 and 76 engage the wire and move away from each other, as shown in FIG. 7, wire 22 is drawn from the reel 20 and is stored between the tension rollers. The length of wire 22 that is stored between the two sets of tension rollers 74 and 76 is greater than the length of the wires or leads being processed by the wire processing unit 12. The wire clamps 80 and 144 are then opened and the wire feed unit 14 and the wire processing unit 12 begin operation. The wire feed device intermittently feeds wire 22 to the wire processing unit 12, as required, drawing wire from the wire stored between the tension rollers 74 and 76 causing the first and second movable slides 42 and 46 to move toward each other against the urging of the differentially pressurized air cylinders 54 and 64. Concurrently, however, the variable speed motor 40 continues to drive the capstan 28 so that wire 22 is being drawn from the reel 20 at a constant speed, thereby partially replenishing the wire stored between the tension rollers 74 and 76 that is being remove by the wire feed device 156. When the wire feed device stops feeding, the wire being continually drawn from the reel 20 by the capstan 28 completely replenishes the wire stored between the tension rollers 74 and 76 to the position shown in FIG. 7, at which time the wire feed device 156 begins to feed wire for the next machine cycle. As the wire feed device alternately feeds wire and then stops feeding wire, the first and second slides 42 and 46 correspondingly move toward and away from each other under the constant pressure of the air cylinders 54 and 64 as wire is alternately drawn off and then replenished. The constant pressure of the two air cylinders assures that the tension on the wire between the capstan 28 and the outlet guide rollers 32 and 34 remains substantially constant. This tension can be adjusted to any desired level by simply adjusting the differential pressure on the two sides of each air cylinder 54 and 64. When the wire feed drive 156 stops feeding during a null period of its feed cycle the wire clamp 80 is closed by the controller 150 to securely hold the wire 22 still and the wire marker 104 is actuated to mark the wire as desired. The wire clamp 80 is then opened and the processing continues as set forth above.

The machine 10 described above includes the wire dereeling unit 18 and the wire marking unit 16, however, either one of these units may be omitted in the practice of the present invention. That is, in the case where wire marking is not required, the wire marking unit 16 may not be present, as shown in FIGS. 8 and 9. In this case the wire dereeling unit 18 is positioned adjacent the wire feed unit 14 as shown. The wire 22 is threaded into the machine, as shown in FIG. 8, in a manner similar to that described above for FIG. 5, and the first and second movable slides 42 and 46 are moved to their second positions, as shown in FIG. 9. This causes the wire 22 to follow a zigzag path between the two sets of tension rollers. As the tension rollers 74 and 76 engage the wire and move away from each other, as shown in FIG. 9, wire 22 is draw from the reel 20 and is stored between the tension rollers. Similarly, the wire marking unit 16 may be used in conjunction with a conventional wire dereeling unit, not shown, of the type described above in Background Of The Invention.

While the wire processing unit 12 is described as an electrical lead making machine in the present example, it may be any machine that performs a manufacturing operation on the wire to produce a wire product or a product that contains a wire subproduct. Additionally, the variable speed motor 40 and capstan 28 are described above as drawing wire from the reel 20 at a substantially constant speed. However, it will be appreciated by those skilled in the art that complex automated machines such as the machine 10 may experience variations in running speed due to changing operating condition. In such case the controller 150 will determine the actual rate of use of the wire 22 by the wire processing unit 12 and will cause the variable speed motor 40 to rotate the capstan 28 at an appropriate corresponding speed. In any case, the speed of the capstan 28 will quickly stabilize at an appropriate constant speed thereby reducing harmful peak forces in the wire being drawn from the reel 20. Further, the tension rollers 74 and 76 are described herein as being journaled in and carried by the first and second movable slides 42 and 46 and operated by the air cylinders 54 and 64. It may be advantageous, under appropriate conditions, to provide a separate movable slide and air cylinder for each tension roller 74 and 76. Such a variation in the structure will be understood to be within the scope of the present invention.

An important advantage of the present invention is that a constant tension is maintained in the wire that is being drawn from the reel thereby preventing over stressing of the wire. Another important advantage is that the marking unit is capable of storing a sufficient length of wire so that the marking operation can be performed during the dwell period of the feed cycle without requiring that the marking unit be positioned at an inordinate distance from the machine. Additionally, the wire threading procedure is simplified by a straight wire threading path extending from the drive mechanism, through the wire tensioning and storage devices, to the feed unit.

I claim:

1. In a machine having a wire feed unit that draws wire from an endless source and a wire processing unit that receives said wire from said feed unit for performing a manufacturing operation therewith, said wire being intermittently fed by said feed unit, a dereeling unit disposed between said endless source and said wire feed unit having a drive means in driving engagement with said wire for removing said wire from said endless source at a constant speed and a tensioning device disposed between said drive means and said feed unit, said feed unit arranged to draw said removed wire, and said tensioning device arranged to maintain a desired tension on said removed wire between said drive means and said feed unit, wherein said drive means and said feed unit define a straight wire threading path that extends through said tensioning device.

2. The machine according to claim 1 wherein said drive means includes a capstan and pressure roller in said driving engagement with said wire for effecting said removing of said wire.

3. The machine according to claim 2 wherein said tensioning device comprises:

(a) a first plurality of tension rollers disposed in a first position on a first side of said wire threading path;
   (b) a second plurality of tension rollers disposed in a first position on a second side of said wire threading path opposite said first side,
   said first and second pluralities of tension rollers being movable in a direction perpendicular to said wire threading path from said first positions to second positions wherein said tension rollers are interengagable with said removed wire for maintaining said desired tension on said removed wire between said drive means and said feed unit.

4. The machine according to claim 3 wherein said first plurality of tension rollers are on said first side of said wire threading path when in said first position and are on said second side of said wire threading path when in said second position, and wherein said second plurality of tension rollers are on said second side of said wire threading path when in said first position and are on said first side of said wire threading path when in said second position.

5. The machine according to claim 4 wherein said first and second pluralities of tension rollers are arranged so that when moving from said first positions to said second positions some of said tension rollers of said first plurality of tension rollers pass between adjacent pairs of tension rollers of said second plurality of tension rollers.

6. The machine according to claim 5 wherein said first plurality of tension rollers are journaled for rotation on a first slide member, said first slide member being in sliding engagement with said frame for moving said first plurality of tension rollers between said first and second positions, and wherein said second plurality of tension rollers are journaled for rotation on a second slide member, said second slide member being in sliding engagement with said frame for moving said second plurality of tension rollers between said first and second positions.

7. The machine according to claim 6 including a first actuator coupled to said frame and said first slide member and a second actuator coupled to said frame and said second slide member, said first and second actuators arranged to urge their respective first and second pluralities of tension rollers into their said respective second positions.

8. The machine according to claim 7 wherein said first and second actuators are air cylinders attached to said frame and having their piston rods coupled to said first and second slide members, respectively, so that when a selected differential pressure is applied to each said air cylinder said tension rollers maintain said desired tension on said wire between said drive means and said feed unit so that during said feeding of said wire said first and second movable slides move toward each other and during null periods of said feeding said first and second movable slides move away from each other.

9. The machine according to claim 3 wherein said feed unit intermittently feeds said wire at an average speed required by said processing unit and wherein said constant speed of removal of said wire is substantially equal to said average speed, said average speed and said constant speed being selectively variable.

10. The machine according to claim 9 including a wire clamp disposed between said tension device of said dereeling unit and said feed unit for clampingly engaging said wire to prevent movement thereof during movement of said first and second plurality of tension rollers from said first position to said second position.

11. The machine according to claim 1 including a wire marking unit, disposed between said dereeling unit and said wire feed unit, comprising:

a wire marker for marking said removed wire, a wire outlet guide spaced therefrom, and a wire storage mechanism disposed between said wire marker and said wire outlet guide arranged for storing a specific length of said removed wire, wherein said straight wire threading path extends through said wire marker, said wire storage mechanism, and said wire outlet guide.

12. The machine according to claim 11 wherein said wire storage mechanism comprises:

(a) a first plurality of storage rollers disposed in a first position on a first side of said wire threading path;

(b) a second plurality of storage rollers disposed in a first position on a second side of said wire threading path opposite said first side, said first and second pluralities of storage rollers being movable in a direction perpendicular to said wire threading path from said first positions to second positions wherein said storage rollers are interengagable with said removed wire for storing said specific length of said removed wire; and (c) locking means for securing said first and second pluralities of rollers in said second positions.

13. The machine according to claim 12 wherein said first plurality of storage rollers are on said first side of said wire threading path when in said first position and are on said second side of said wire threading path when in said second position, and wherein said second plurality of storage rollers are on said second side of said wire threading path when in said first position and are on said first side of said wire threading path when in said second position.

14. The machine according to claim 13 wherein said first and second pluralities of storage rollers are arranged so that when moving from said first positions to said second positions some of said storage rollers of said first plurality of storage rollers pass between adjacent pairs of storage rollers of said second plurality of storage rollers.

15. The machine according to claim 14 wherein said first plurality of storage rollers are journaled for rotation on a third slide member, said third slide member being in sliding engagement with said frame for moving said first plurality of storage rollers between said first and second positions, and wherein said second plurality of storage rollers are journaled for rotation on a fourth slide member, said fourth slide member being in sliding engagement with said frame for moving said second plurality of storage rollers between said first and second positions.

16. The machine according to claim 15 wherein said locking means comprises each of said third and fourth slide members being releasably attachable to said frame in any selected position between said first and second positions.

17. The machine according to claim 16 including a first wire clamp disposed between said tensioning device of said dereeling unit and said wire marker for clampingly engaging said wire to prevent movement thereof during operation of said wire marker.

18. The machine according to claim 17 including a second wire clamp disposed between said wire outlet guide of said wire marker and said feed unit for clampingly engaging said wire during movement of said first and second plurality of storage rollers from said first position to said second position.

19. In a machine having a wire feed unit that draws wire from an endless source and a wire processing unit that receives said wire from said feed unit for performing a manufacturing operation therewith, a wire marking unit between said endless source and said wire processing unit comprising a wire marker for marking said wire and a wire outlet guide spaced therefrom thereby defining a straight wire threading path between said wire marker and said wire outlet guide, including a wire storage mechanism disposed between said wire marker and said wire outlet guide arranged for storing a specific length of said wire, said straight wire threading path extending through said wire storage mechanism.

20. The machine according to claim 19 wherein said wire storage mechanism comprises:

(a) a first plurality of storage rollers disposed in a first position on a first side of said wire threading path;

(b) a second plurality of storage rollers disposed in a first position on a second side of said wire threading path opposite said first side, said first and second pluralities of storage rollers being movable in a direction perpendicular to said wire threading path from said first positions to second positions wherein said storage rollers are interengagable with said wire for storing said specific length of said wire and (c) locking means for securing said first and second pluralities of rollers in said second position.

21. The machine according to claim 20 wherein said first plurality of storage rollers are on said first side of said wire threading path when in said first position and are on said second side of said wire threading path when in said second position, and wherein said second plurality of storage rollers are on said second side of said wire threading path when in said first position and are on said first side of said wire threading path when in said second position.

22. The machine according to claim 21 wherein said first and second pluralities of storage rollers are arranged so that when moving from said first positions to said second positions some of said storage rollers of said first plurality of storage rollers pass between adjacent pairs of storage rollers of said second plurality of storage rollers.

23. The machine according to claim 22 wherein said first plurality of storage rollers are journaled for rotation on a third slide member, said third slide member being in sliding engagement with said frame for moving said first plurality of storage rollers between said first and second positions, and wherein said second plurality of storage rollers are journaled for rotation on a fourth slide member, said fourth slide member being in sliding engagement with said frame for moving said second plurality of storage rollers between said first and second positions.

24. The machine according to claim 23 wherein said locking means comprises each of said third and fourth slide members being releasably attachable to said frame in any selected position between said first and second positions.

* * * * *